United States Patent [19]
Wen et al.

[11] Patent Number: 6,019,151
[45] Date of Patent: *Feb. 1, 2000

[54] PRINTING ONTO DISCS SUCH AS COMPACT DISCS AND THE LIKE

[75] Inventors: Xin Wen, Rochester; James T. Stoops, Walworth, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,695

[22] Filed: Jan. 7, 1997

Related U.S. Application Data
[60] Provisional application No. 60/060,454, Sep. 29, 1997.

[51] Int. Cl.[7] .................................................. B32B 31/00
[52] U.S. Cl. ........................... 156/387; 156/384; 156/429; 156/DIG. 49; 346/75
[58] Field of Search ................................ 274/42; 346/75, 346/140, 1.1, 108, 160, 107 R, 134, 136; 156/387, 384, 39, 429, DIG. 49

[56] References Cited

U.S. PATENT DOCUMENTS

| | | | |
|---|---|---|---|
| 4,066,268 | 1/1978 | Borchard et al. | |
| 4,393,386 | 7/1983 | Di Giulio | 346/75 |
| 4,534,313 | 8/1985 | Louvel | 118/698 |
| 4,604,631 | 8/1986 | Jinnai et al. | 346/1.1 |
| 4,680,596 | 7/1987 | Logan | 346/140 PD |
| 5,317,337 | 5/1994 | Ewaldt | |

Primary Examiner—Merrick Dixon
Attorney, Agent, or Firm—Walter S. Stevens

[57] ABSTRACT

Apparatus is provided for digital printing images in annular-radial coordinates onto discs having an axis of rotation, the printing to occur between an inner radius $R_1$ of the disc and an outer radius $R_2$ of the disk. The Apparatus includes a linear printhead array extending radially of the disc at least between inner radius $R_1$ and outer radius $R_2$; and a drive adapted to rotate the disc about the axis while the printhead is imagewise addressed to create an imaged area that is symmetric to the center of the disc. The drive is adapted to rotate the disc at an annular velocity such that the spatial resolution of the printed image along the outer edge of the image is the same as that of an original image being printed. The image area may be continuous about substantially the entire annular surface of the disc or divided into discrete sections to be printed in associated tiles located on the disc such that:

$$(x_i, y_i) => (r_i, \theta_i),$$

where $(x_i, y_i)$ are local coordinates of the center of the associated tile, and $\theta_i$ is determined by a radial line through the center of the associated tile. Generally, the lower corners of the tiles would not overlap each other. Each pixel having a position $(x, y)$ within each tile is translated to a polar coordinate $(r, \theta)$ on the disc by the following two equations:

$$x - x_i = r \sin(\theta - \theta_i)$$

$$y - y_i = r \cos(\theta - \theta_i) - r_i$$

$$r_2/r_1 = R_2/R_1.$$

9 Claims, 13 Drawing Sheets

PRINTING ONTO DISCS SUCH AS COMPACT DISCS AND THE LIKE

CROSS REFERENCE TO RELATED APPLICATION

Reference is made to and priority claimed from U.S. Provisional Application Serial No. 60/060,454, filed Sep. 29, 1997.

BACKGROUND OF THE INVENTION

1. Technical Field

This invention relates generally to an apparatus and process for printing onto discs, such as printing labels onto compact discs and the like.

2. Background Art

Compact discs (CDs) are high-volume data storage media having an optically-readable surface. A CD typically carries a label on the opposite side of the optically-readable surface. The label protects the CD from physical damage, and is usually printed with, say, a description of the information stored on the CD. The printed information may be logos, text, graphics, and/or bar codes. Because the CD spins at high speed in the writer or the player, the CD label needs to be precisely balanced to the center.

The labels have traditionally been printed by the screen printing technique, whenever the same image is repetitively printed on a large number of CDs. Currently, several trends exist in CD label printing, such as for example personalized labels on the labeling surface.

For personalized labels, different information is required for each CD, or for groups of a small number of CDs. The traditional screen printing method is not economical for this personalized labels because of the high cost and lengthy time involved in setting up each image.

Recently, ink jet and thermal wax transfer printing techniques have begun to be used to provide flexibility in designing and manipulating the label images. These digital printing techniques can provide flexibility in designing and manipulating the label images, and the label images can be easily designed and odified on a computer. The ink jet label printing requires a hydroscopic coating on the CD surface for accepting aqueous ink solutions. The thermal wax transfer can print on a lacquer (shiny), matte, or silk-screened disc surface. Both printing techniques, though, are bi-model in nature and are therefore not suitable for printing continues tone photographic images.

Many users want to print photographs on the labeling surface of the CDs. This is especially desired for photo CDs, where thumbnail images can be printed on the label as an index of the images stored in the CD. A photographic image is best printed with a continuous-tone printer, rather than bi-model printer such as ink jet or thermal wax transfer printers.

For artistic effect and higher information content, it is desired to print the text, graphics and images onto a disc 10 in annular-radial coordinates as illustrated in FIG. 1A, rather than in orthogonal x-y coordinates as shown in FIG. 1B. Although this may be done with screen printing, the current digital printing techniques print in orthogonal coordinates.

FIG. 2 illustrates the current CD printing method using thermal wax transfer techniques as disclosed in U.S. Pat. No. 5,317,337. The application is intended for a bi-modal (single bit) image; not for photographs. A printhead 12 is placed across the diameter of the disc and presses against the disc label surface with dye donor media 14 therebetween. During printing, the printhead moves across the outer and inner edges of the CD. This increases the wear and the probability for damage in the delicate printhead. Furthermore, since the head load is normally fixed, the nip pressure varies along the printing direction as the length of contact area changes. This causes variability in image densities and color balances, which does not allow printing at photographic qualities. Finally, this printing method prints images in an orthogonal coordinate.

U.S. Pat. No. 5,317,337 disclosed another CD label-printing technique (FIG. 3 hereof). An ink jet printhead 16 prints along the radial direction in a rectangular print area 18. For printing on a different area 20, the disc is first rotated to the desired angular position and area 20 is printed along the radial direction. Because the printing areas are rectangular in shape, they cannot perfectly match the annular shape of the label area on the CD. The alternative motions along the radial and azimuthal directions also lengthens the printing time.

DISCLOSURE OF THE INVENTION

It is an object of present invention to overcome the above difficulties by a novel thermal resistive dye printer and printing methods for printing labels on CDs.

According to a feature of the present invention, apparatus is provided for digital printing images in annular-radial coordinates onto discs having an axis of rotation, the printing to occur between an inner radius $R_1$ of the disc and an outer radius $R_2$ of the disk. The Apparatus includes a linear printhead array extending radially of the disc at least between inner radius $R_1$ and outer radius $R_2$; and a drive adapted to rotate the disc about the axis while the printhead is imagewise addressed to create an imaged area that is symmetric to the center of the disc.

According to a preferred embodiment of the present invention, the drive is adapted to rotate the disc at an annular velocity such that the spatial resolution of the printed image along the outer edge of the image is the same as that of an original image being printed. The image area may be continuous about substantially the entire annular surface of the disc or divided into discrete sections to be printed in associated tiles located on the disc such that:

$$(x_i, y_i) => (r_i, \theta_i),$$

where $(x_i, y_i)$ are local coordinates of the center of the associated tile, and $\theta_i$ is determined by a radial line through the center of the associated tile. Generally, the lower corners of the tiles would not overlap each other. Each pixel having a position $(x, y)$ within each tile is translated to a polar coordinate $(r, \theta)$ on the disc by the following two equations:

$$x - x_i = r \sin(\theta - \theta_i)$$

$$y - y_i = r \cos(\theta - \theta_i) - r_i.$$

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1A:
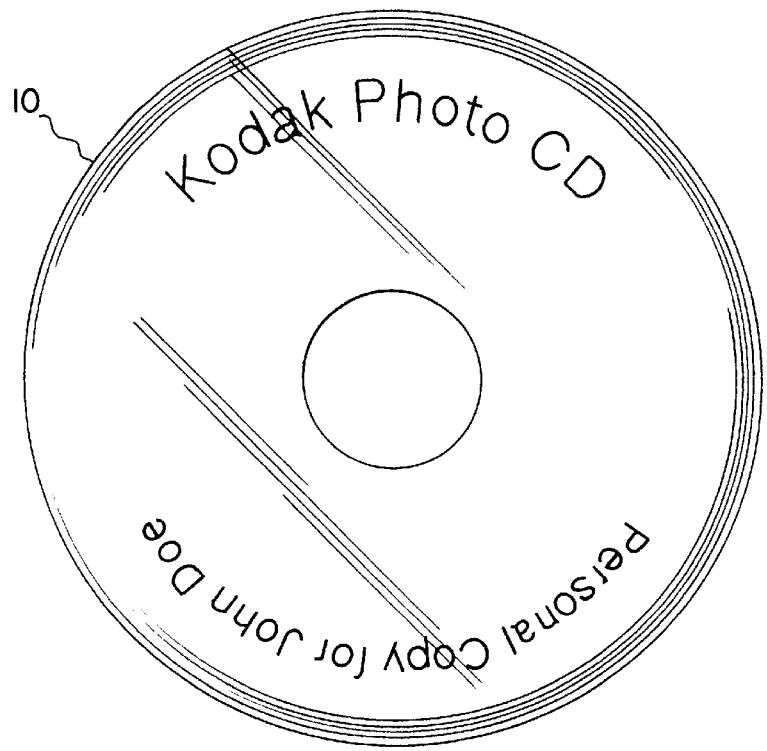
FIGS. 1A and 1B compare printing layouts in the present invention and the prior art, respectively.
Figure 1B:
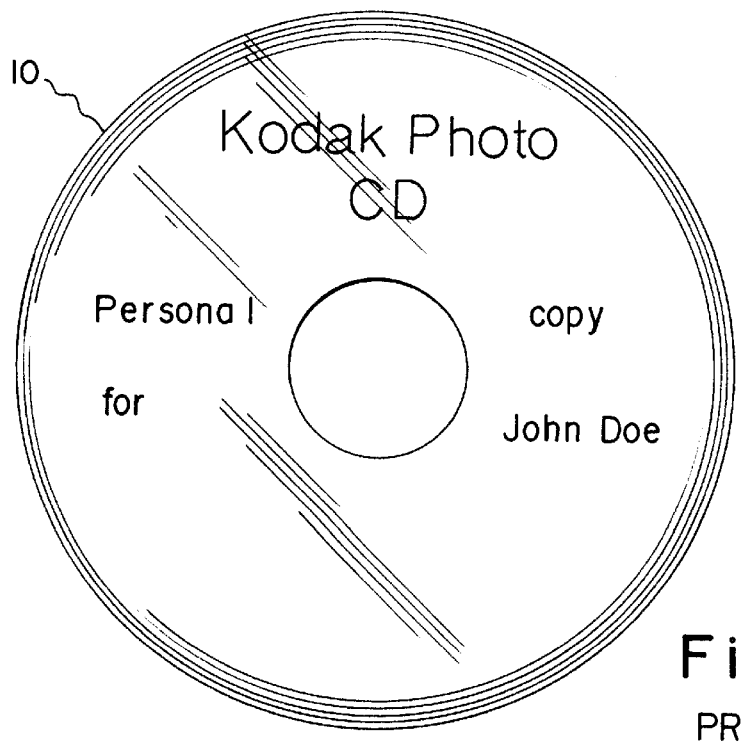
Figure 2:
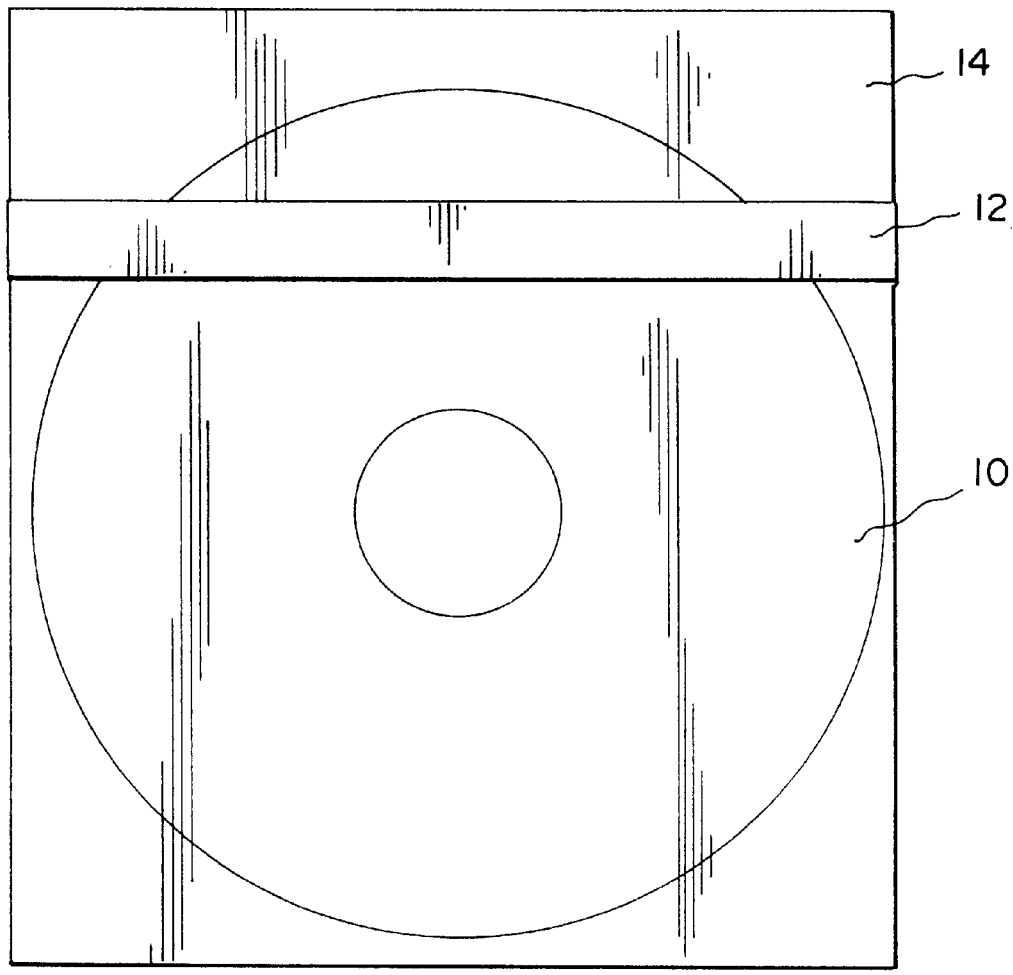
FIG. 2 shows a prior art printing method.
Figure 3:
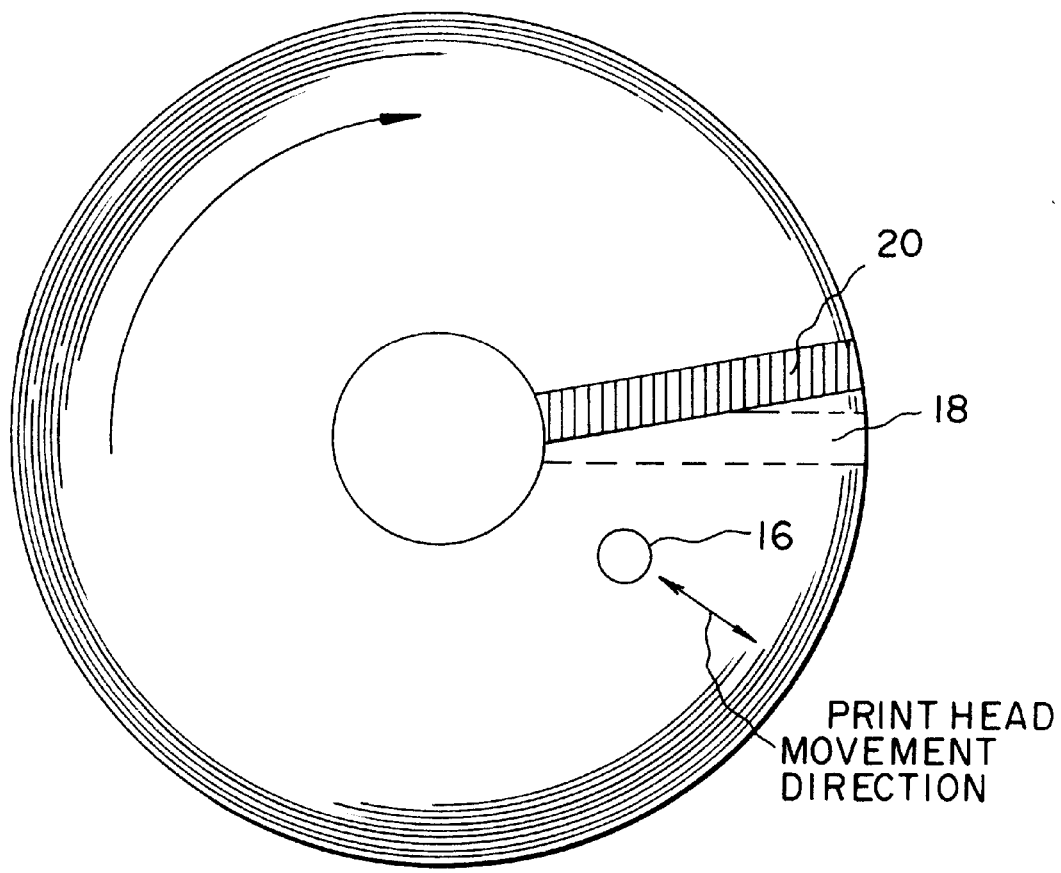
FIG. 3 shows another prior art printing method.
Figure 4:
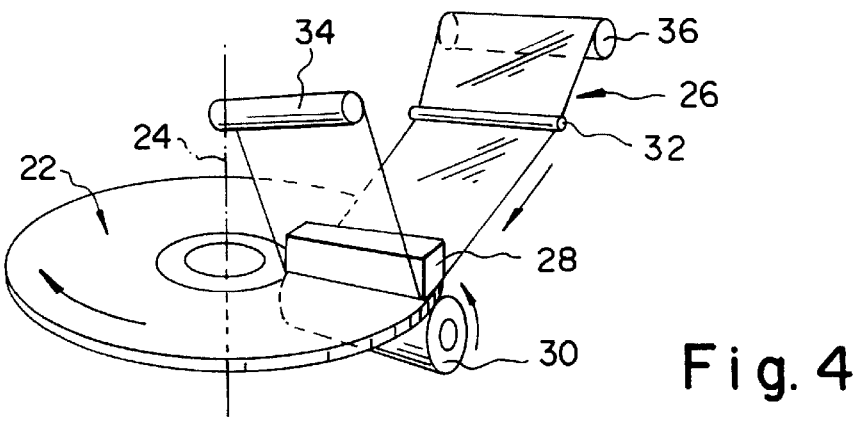
FIG. 4 shows a thermal dye transfer printing system for printing CD labels according to the present invention.

A thermal dye printing system according to the present invention is illustrated in FIG. 4. A compact disc 22 is held by a spindle along its inner edge and is rotated by a motor (not shown) about an axis 24 through the center of the disc and perpendicular to the disc. The disc is compressed against a donor web 26 between a resistive thermal printhead 28 and a cone-shaped, free wheeling platen roller 30. Alternatively, the platen roller may be the master driver for the disc, and the spindle holding the disc through the center would be freewheeling. Different from the methods disclosed in U.S. Pat. No. 5,317,337, printhead 28 is aligned radially of disc 22, and prints continuously along the azimuthal direction. The printed area can perfectly fit the annular area of the CD label. The circular printing path naturally prints images symmetric to the center of the disc, which is advantageous to the prior art because the high rotation speeds in CD writers and players require mass balance to the center of the CD.

Donor web 26 is trained between printhead 28 and disc 22. At the outer edge of the disc, the donor web moves at the same velocity as the disc surface, and there is no relative movement between the donor web and the disc. Since the donor web is uniformly translated, the donor web inside the outer edge moves faster relative the disc surface. A differential tension control mechanism 32 is provided to balance the tension difference across the web. The differential tension control can alternatively be implemented on donor take-up and supply rollers 34 and 36, respectively. Orientations of the rollers can be adjusted to balance the tension difference on the two sides of the web. This differential tension control mechanism also prevents the lateral movement of the donor in the nip region.

Figure 5:
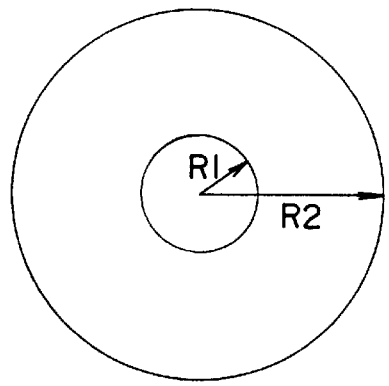
FIG. 5 is a top plan view of a CD showing dimensions thereof.
Figure 6:
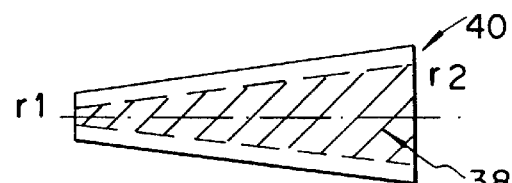
FIG. 6 is a side sectional view of a portion of the printing system of FIG. 4.

FIG. 5 is a plan view of disc 22 illustrating the inner radius ($R_1$) and the outer radius ($R_2$) of the label area. FIG. 6 is a sectional view of platen roller 30 illustrating the inside radius ($r_1$) and the outside radius ($r_2$). The ratio of the outside radius ($r_2$) to inside radius ($r_1$) of platen roller 30 is substantially equal to the ratio of the outer radius ($R_2$) to inner radius ($R_1$) of the compact disc such that:

$$r_2/r_1 = R_2/R_1.$$

This is desired so that the velocity on the surface of platen roller 30 matches the velocity of the surface of disc 22 at every point of the contact area. A metal shaft 38 in the platen is also cone-shaped so that an elastomer layer 40 of the platen roller provides a similar amount of compliance along printhead 28.

Figure 7:
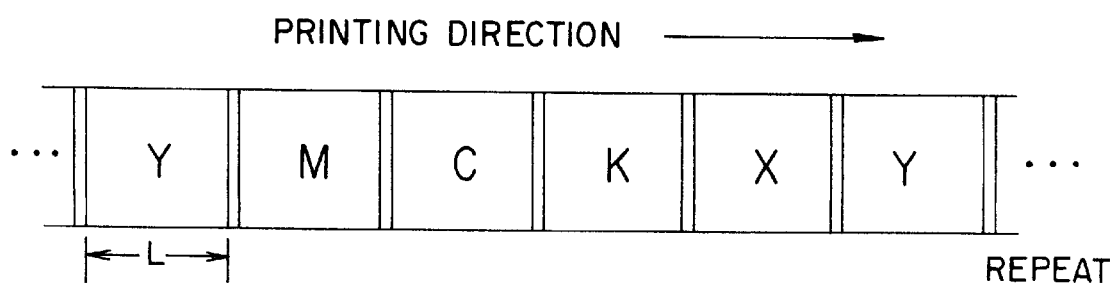
FIG. 7 shows the layout of a donor web usable with the printing system of FIG. 4.

The layout of donor web 26 is shown in FIG. 7. The length "L" of each of a plurality of colored dye patches Y, M, C, K, and X is longer than the circumstance of the disc so that each color plane can be printed continuously for the whole label until the color plane is completed. That is, the patch length L is:

$$L \geq 2\Pi R_2$$

The printing procedure is, for example, in the sequence of yellow (Y), magenta (M), cyan (C), black (K) and lamination (X). Transparent or printed bars may be inserted between the patches for sensing the donor movement.

Figure 8:
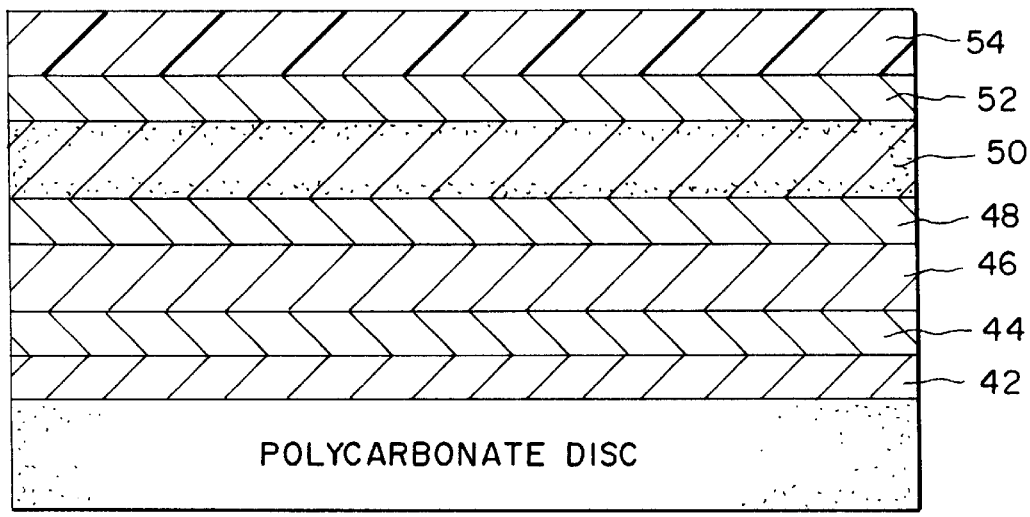
FIG. 8 shows the cross section of a compact disc.
Figure 9:
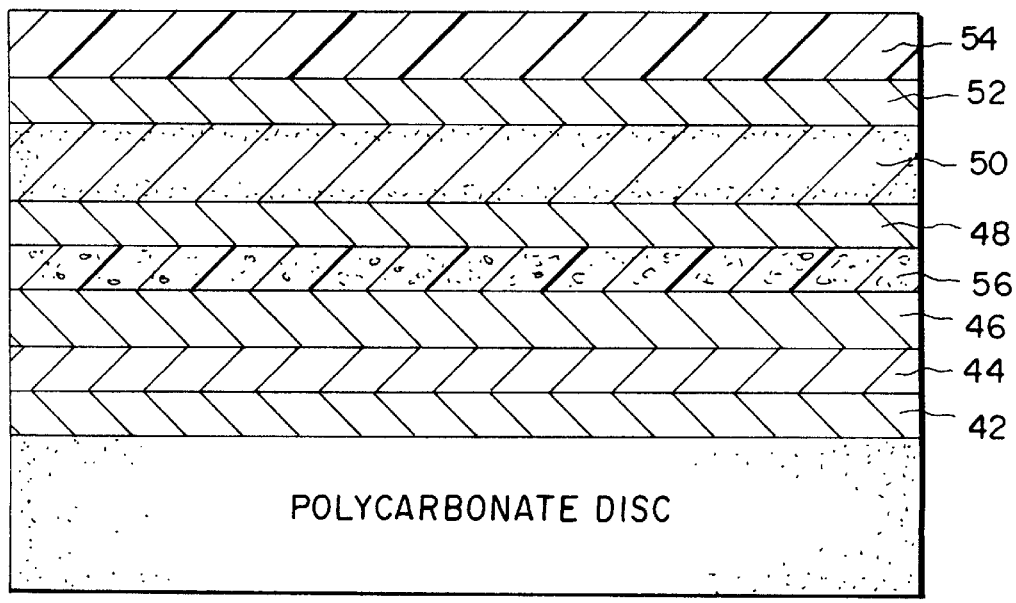
FIG. 9 shows the cross section of another compact disc.

Two examples of structures of the compact disc according to the present invention are illustrated in FIGS. 8 and 9. In FIG. 8, the primary information, like in prior art CDs, is stored between a dye layer 42 and a metallized layer 44, which are covered by a protection layer 46, a subbing layer 48, a thermal dye receiving layer 50, an overcoat layer 52, and a lamination layer 54. In label printing, a dye image is transferred into dye receiving layer 50. The lamination is printed onto the disc as the last step for preventing finger printing and abrasion. According to the embodiment structure illustrated in FIG. 9, a compliant cushion layer or layers 56 is added between protection layer 46 and dye receiving layer 50. The purpose of the cushion layer is to provide compliance at the nip region during printing, which improves print uniformity. Detailed disclosure of compositions suitable for subbing layer 48, thermal dye receiving layer 50, overcoat layer 52, and lamination layer 54 are disclosed in commonly assigned U.S. Pat. No. 5,244,861.

Image Processing

Original images often contain rectangular boundaries. These images need to be properly processed before printing.

Figure 10:
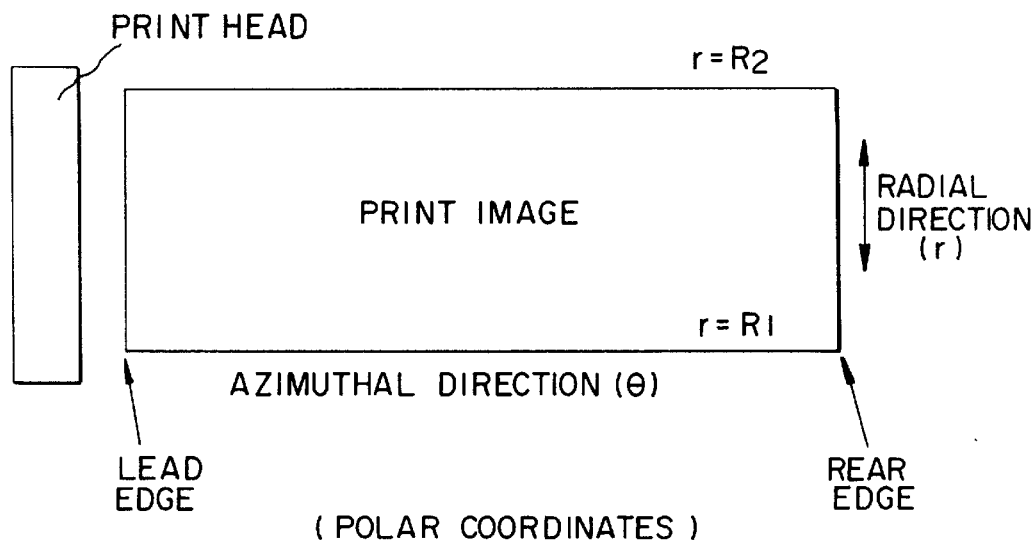
FIG. 10 shows a first image processing method according to the present invention.

In the image processing method illustrated in FIG. 10, the width of the image is kept the same as the width of the annular label area ($R_2$–$R_1$). The image resolution along the radial direction is scaled to be consistent with the pixel density of the printhead, typically 300 pixel per inch for thermal dye sublimation printing. The image size is properly scaled along the lateral (or the azimuthal) direction. A vertical line in the original image is printed along the radial direction and a horizontal line is printed along the azimuthal direction. During printing, a whole line of image data is transferred and printed along the radial direction. The lateral dimension of the image is automatically scaled proportional to the radius. The angular velocity of the disc is chosen such that the spatial resolution of the printed image along the outer edge of the image is the same as the original image. Since the surface speed of the disc is slower inside the outer edge, the spatial resolution is higher than the original image. The printed area matches the shape of the annular label area. This image processing method tends to stretch the lateral dimensions of the printed object as the radius increases. The advantage of this method is that an image is continuously printed without discontinuities, and the method is ideal for printing continuous images such as photographs.

Figure 11:
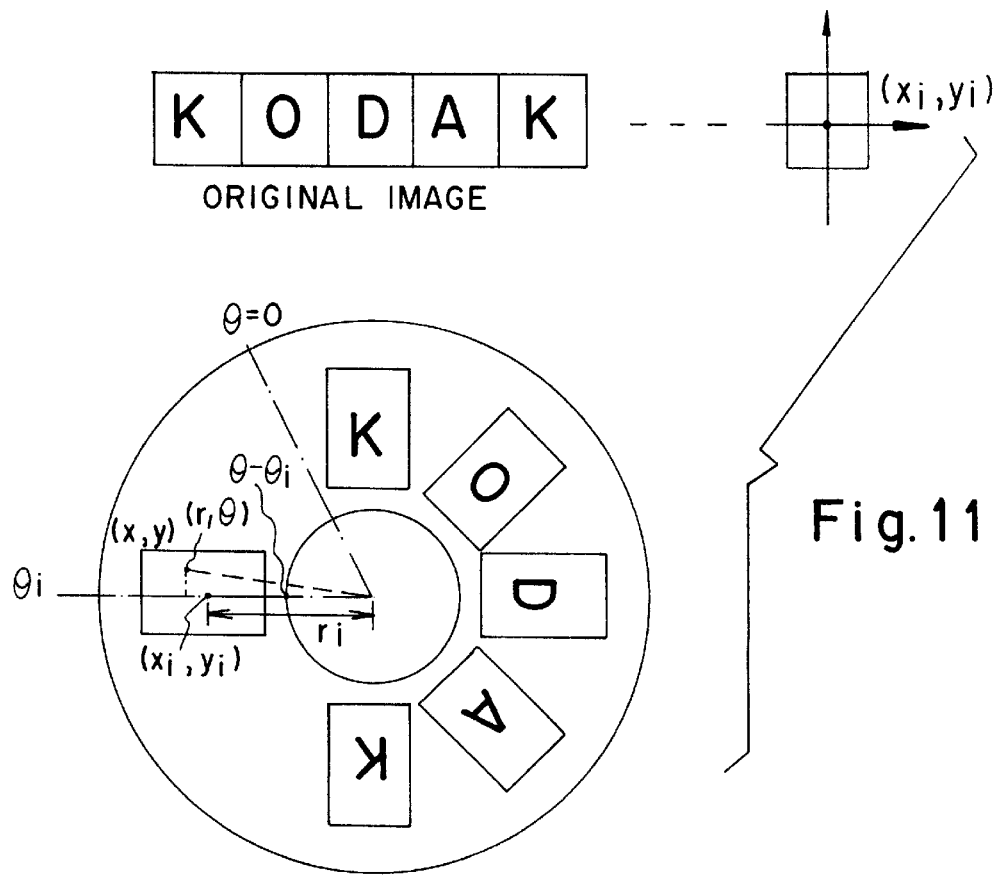
FIG. 11 shows a second image processing method according to the present invention.

The second image processing method is illustrated in FIG. 11. In this method, letters or symbols in the original image have gaps between them. A grid structure is first determined so that each symbol or letter fits into one tile. The center of the $i^{th}$ tile is defined by the coordinate ($x_i$, $y_i$), which are local coordinates with the origin at the center of each tile. Tile dimensions can be any size equal to or smaller than that allowed by the labeling area.

Next, the locations of the tiles on the disc are determined such that:

$$(x_i, y_i) => (r_i, \theta_i)$$

with $\theta_i$ being determined by the radial line through the center of the tile, and with the requirement that the lower corners of the tiles do not overlap each other. Last, the pixel position (x, y) within each tile is translated to the polar coordinate (r, $\theta$) on the disc by the following two equations:

$$x - x_i = r \sin(\theta - \theta_i)$$

$$y - y_i = r \cos(\theta - \theta_i) - r_i.$$

This image processing method preserves the shape of the printed object, and is ideal for printing symbols and text where gaps exist between the printed objects.

When an image contains both images and symbols, the two methods can be combined so that the images are continuously scaled and printed, and the shape of the symbols and letters are preserved.

Printing Control

Figure 12:
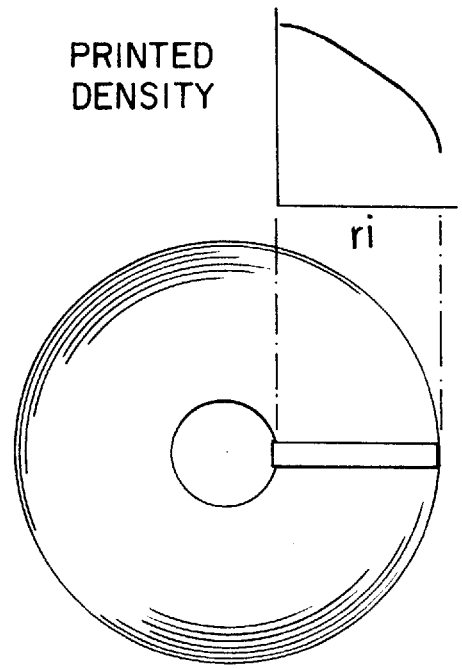
FIG. 12 shows the loss in print density with increased radius in an uncompensated system.

Special care should be taken to achieve uniform printing density and maximum bit-depth in the printed area. Since the velocity of the printhead relative to the disc increases as a function of the radius, more power is needed along the printhead at larger radii. If the printhead power is not increased for larger radii, the printed density will decrease as the radius increases. This drop off in density is illustrated in FIG. 12.

Figure 13:
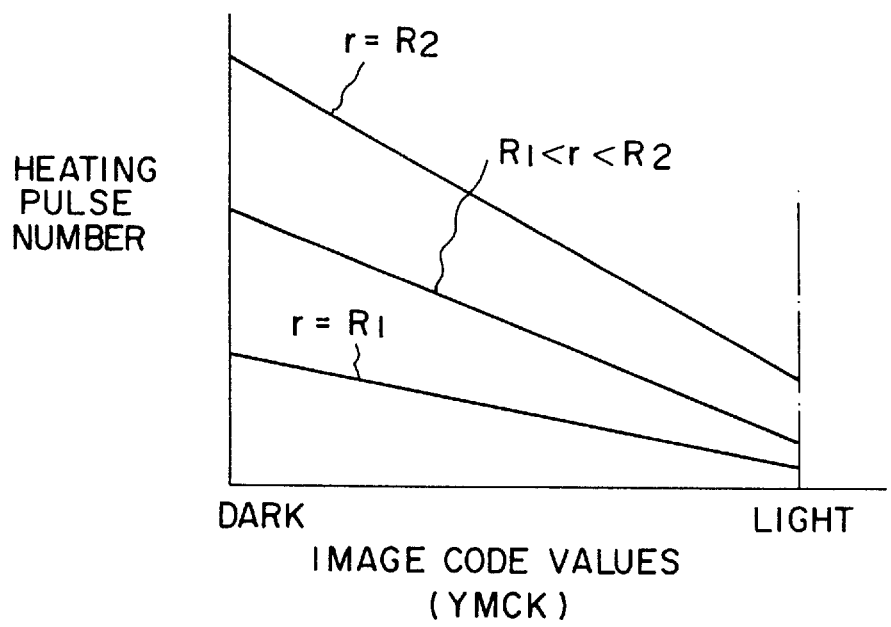
FIG. 13 shows a family of radius dependent data calibration curves.
Figure 14:
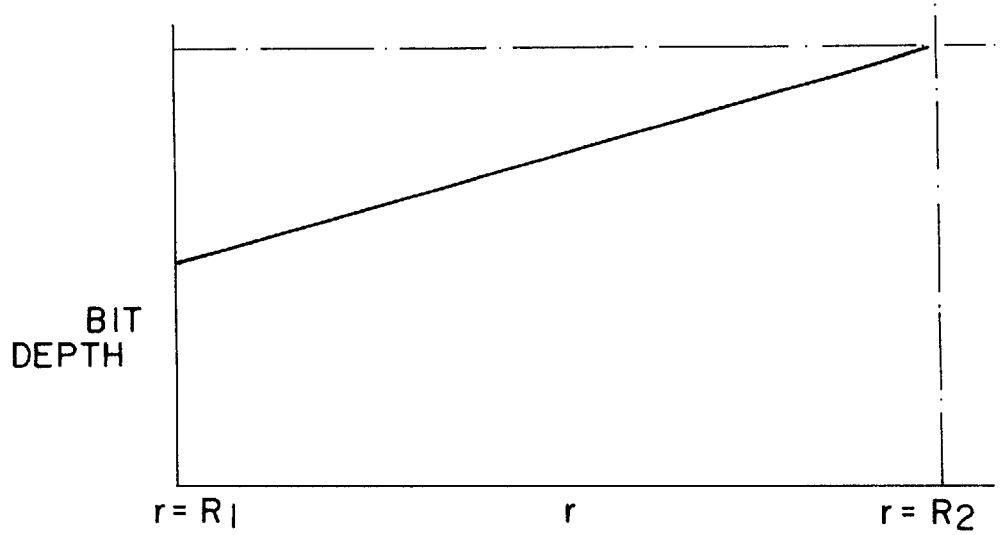
FIG. 14 shows the loss in bit depth as a function of radius using a first imaging printing control method.

One method of compensation is to apply a radius-dependent calibration function to the image data as shown in FIG. 13. The calibration function for each printing element is dependent on its radial position. FIG. 13 illustrates that the maximum number of heating pulses for printing elements near the inner radius is less than the maximum number of heating pulses for printing elements near the outer radius. As a result, an input image with a constant code value will yield a uniform density across the CD regardless of the radial position of the image. This type of compensation has the advantage that it may be implemented with any type of printing system (printhead voltage and enable pulse width need not to be changed). The exact nature of the calibration function will be dependent on the specific printing system. FIG. 14 illustrates that the number of available print levels, or bit depth, may be sharply reduced at the inner radii. This reduction in bit depth can cause contouring and other undesirable artifacts with some printing systems.

Figure 16:
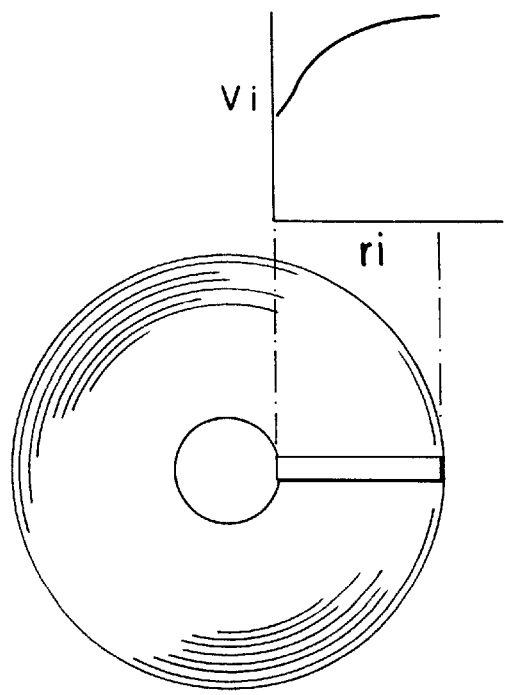
FIG. 16 shows a radius dependent voltage function.
Figure 15:
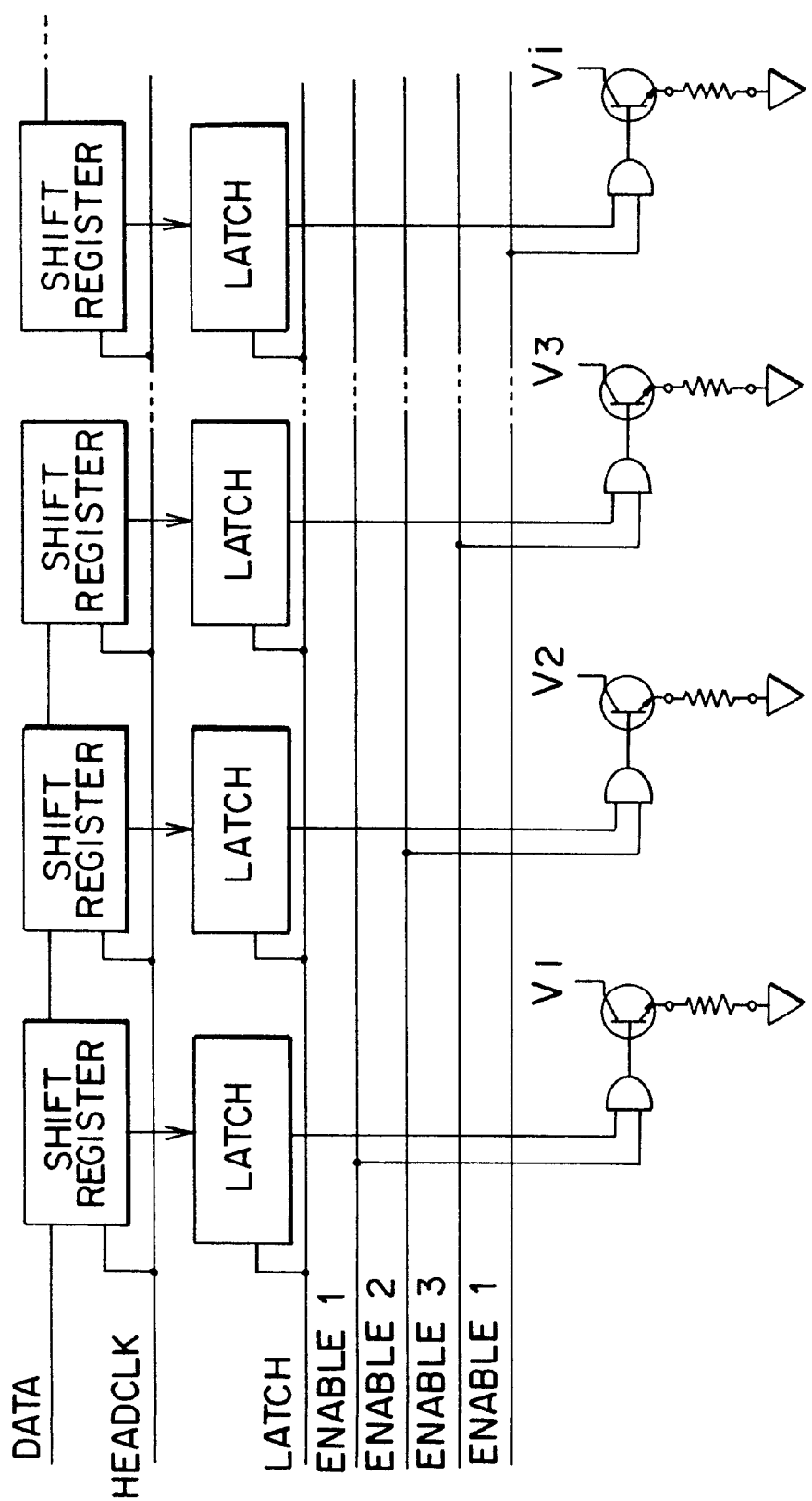
FIG. 15 is a block diagram of a resistive thermal printhead which allows control over voltage and enable time of each heater element.
Figure 17:
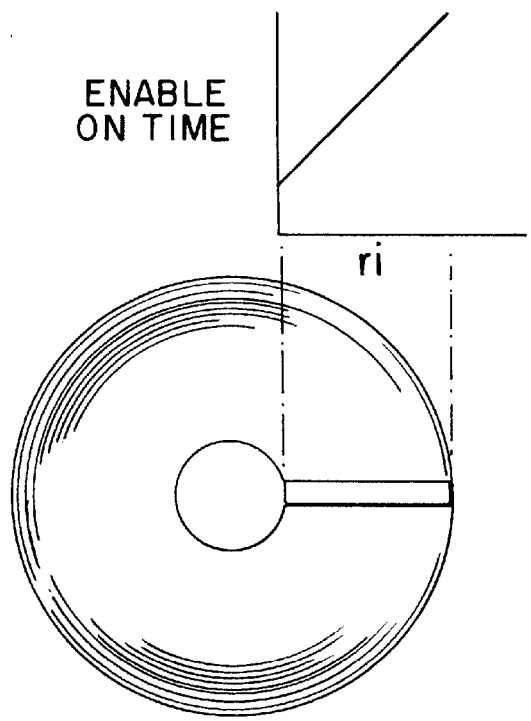
FIG. 17 shows a radius dependent enable function.
Figure 18:
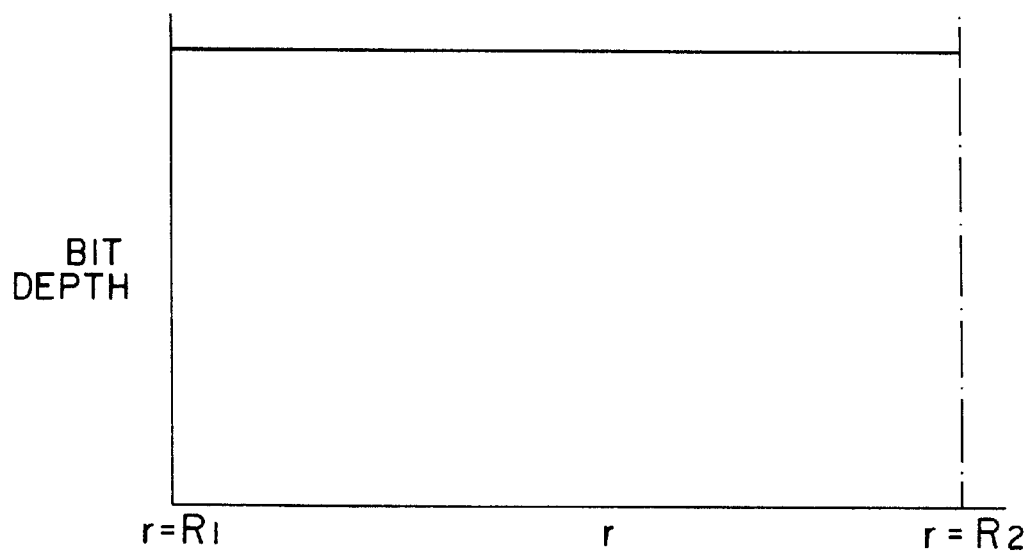
FIG. 18 shows the conservation of bit depth as a function of radius using a second printing control method.

Another method for compensating for the velocity change with distance from the center of the disc is to provide a data-independent printing gain function along the radius of the disc. FIG. 15 illustrates the architecture of a resistive element printhead which allows control of the voltage and enable time for each heater element. The gain function may be implemented on such a printhead by controlling the voltage applied to each printing element of the printhead as a function of the element's radial position. FIG. 16 shows that the voltage applied to the heater elements increases as the heater elements radial position increases. Alternatively, the gain function may be implemented by controlling the amount of time the heating element is energized as a function of the element's radial position, as shown in FIG. 17. These gain functions may be applied alone, together, or in conjunction with other gain functions. Other types of printing devices such as ink jet or electrophotographic printers may provide alternate methods of implementing this gain function. For example, in compact disc printing using ink jet, inkdroplet ejection frequencies can be varied as a function of radius to achive uniform printing density. Unlike the first printing control method, bit depth may remain constant across the radius of the disc, as illustrated in FIG. 18.

Figure 19:
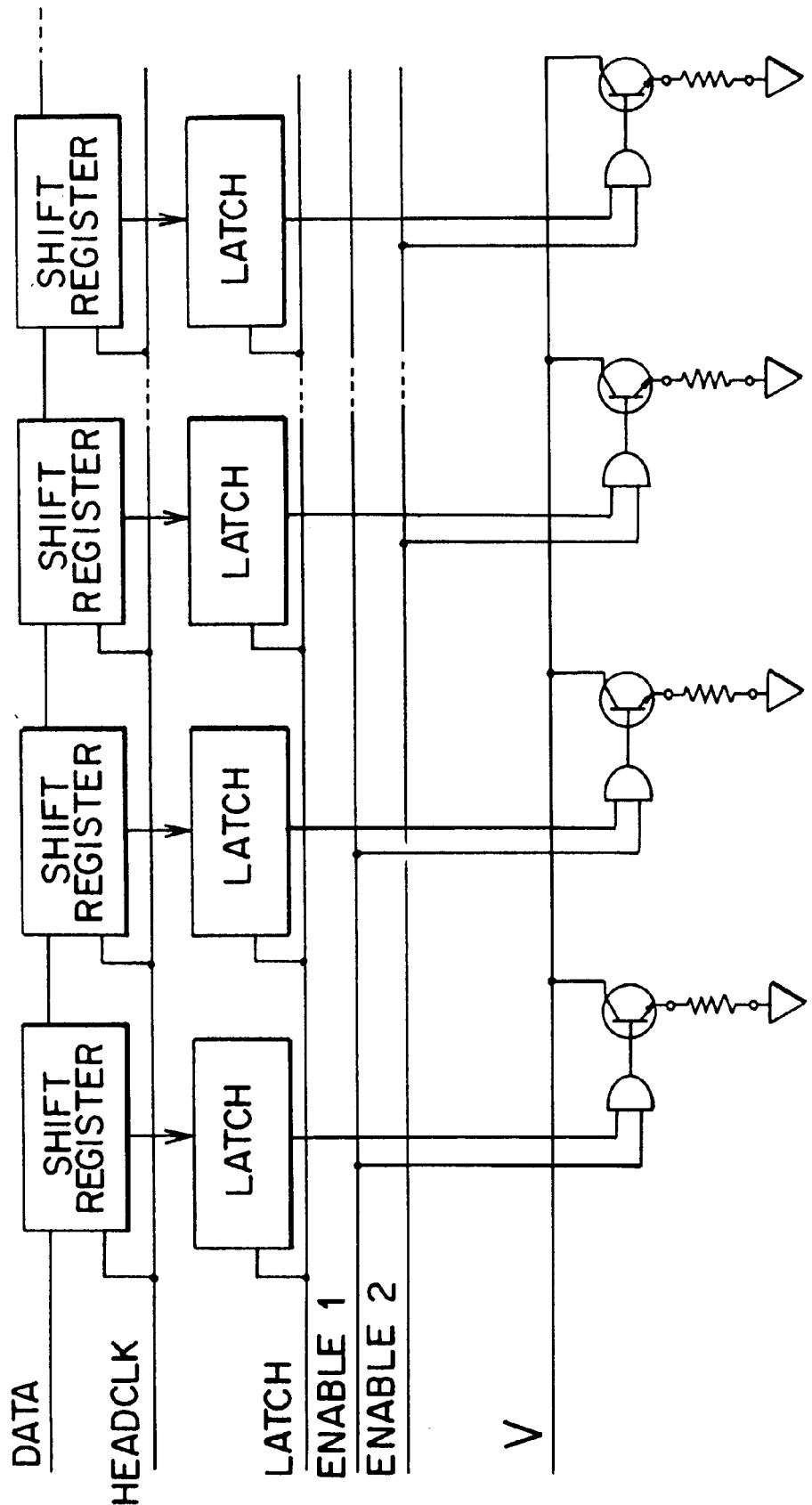
FIG. 19 shows a block diagram of a commonly found resistive thermal printhead.
Figure 20:
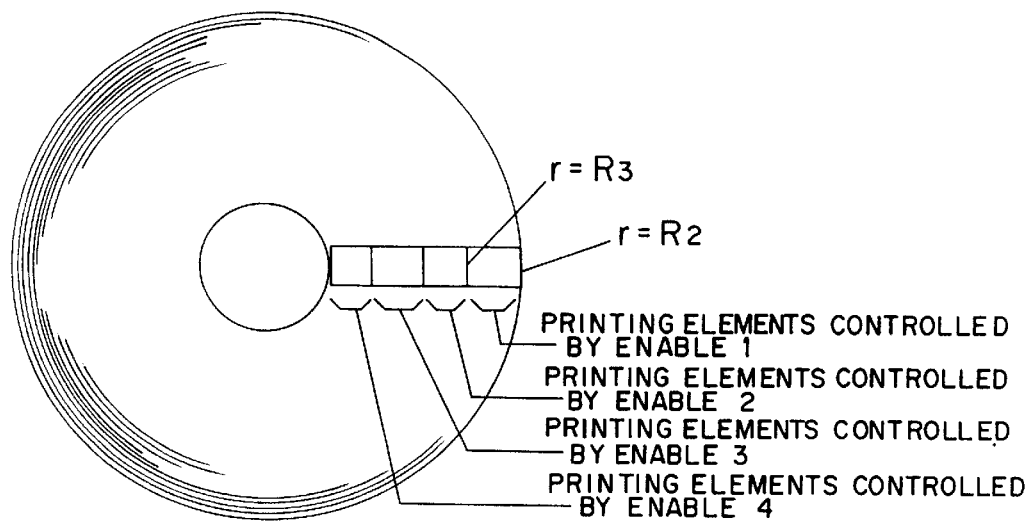
FIG. 20 shows the grouping of heater elements by enable control.
Figure 21:
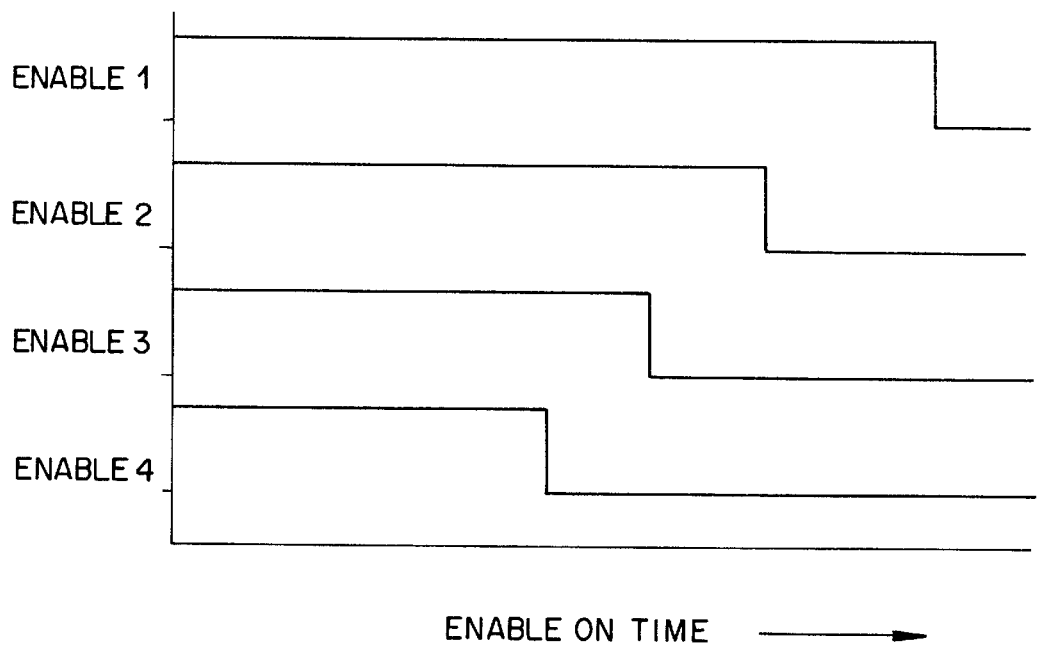
FIG. 21 shows a set of radius dependent enable functions for use with a third printing control method.

Still another method of compensating for the velocity change along the disc radii is to use a combination of the data calibration first printing control method and the gain adjustment second printing control method. Not all resistive element printheads for example, provide control over the voltage and enable time for each printing element. Commercially available printheads typically provide for a single common print element voltage, and possibly several independent blocks of enables as shown in FIG. 19. FIG. 20 illustrates the grouping of the heater elements along the radius of the disc. One implementation of this method would adjust the enable time for each group of pixels as a function of the group's radial position as illustrated in FIG. 21, which shows that the enable on time increases with the radial position of the groups. The implementation of the data calibration function used with this method only needs to compensate for the velocity difference between the inner and outer radii of the group of pixels controlled by a single enable signal. This contrasts with the requirement of the first printing control method, in which the data calibration function needed to compensate for the velocity difference between the inner and outer radius of the entire printing area. Correspondingly, when using this method, the loss in bit depth at the inner radius of each group of printing elements is less that the loss in bit depth of the inner radius of the disc using the first method.

Figure 22:
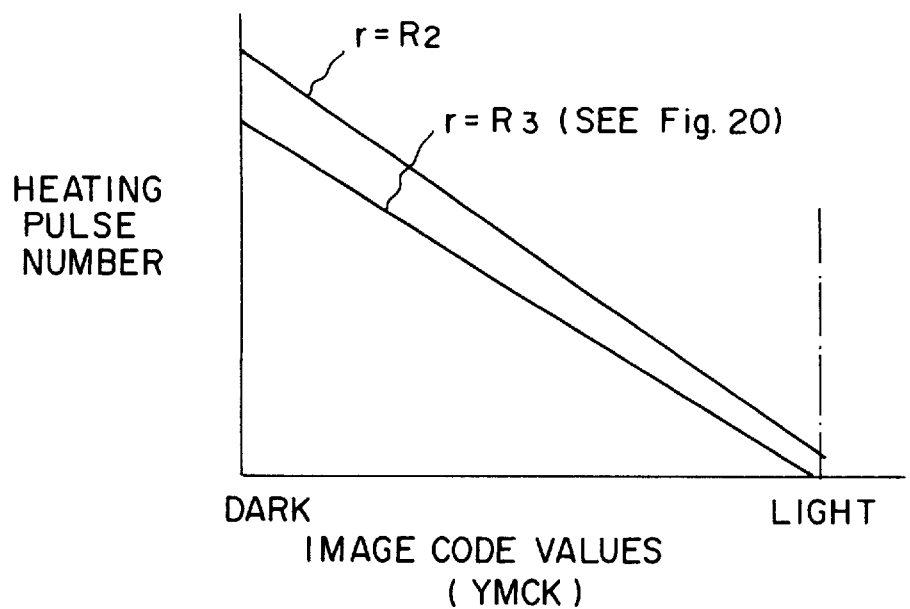
FIG. 22 shows a family of data calibration functions to be used with the third printing control method.
Figure 23:
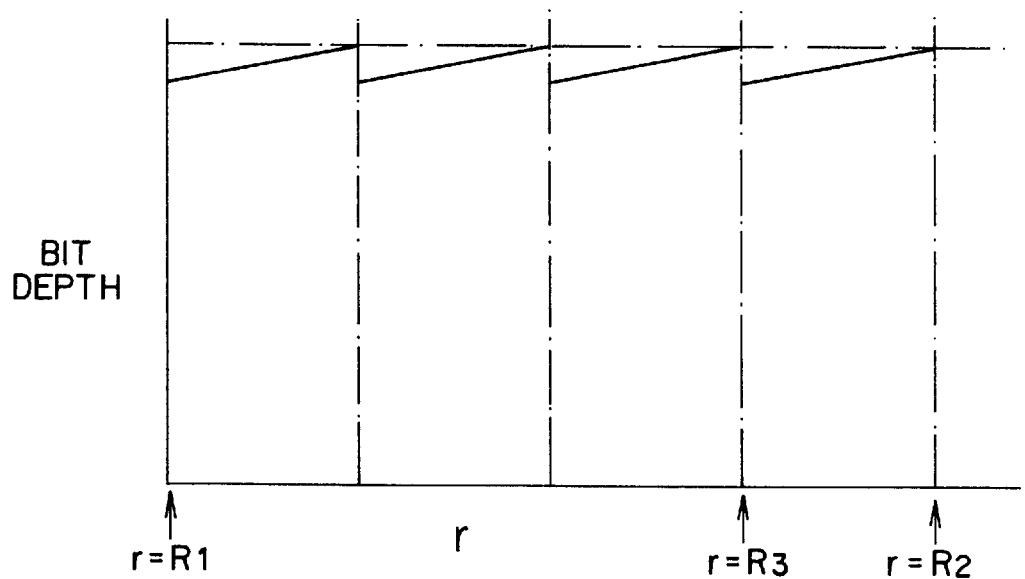
FIG. 23 shows the loss in bit depth as a function of radius using the third printing control method.

FIG. 22 illustrates a family of data calibration functions for a group of pixels controlled by an enable signal. It is understood that the data calibration functions of the other groups of elements would have similar families of calibration functions. This method can be interpreted as using the enable signal for each group as a coarse gain compensation. The data calibration function then provides a fine, radius-dependent, calibration for each pixel. Because the enable grouping provides the coarse compensation, the extent of the data calibration is reduced, and therefore the loss in bit depth at the inner radii is decreased as compared to the data calibration of the first printing control method. FIG. 23 illustrates the bit depth as a function of radius achieved with this method.

Advantages

The present invention provides a continuous-tone digital printing method that prints customized photographic images. The printing method lowers the probability of causing damage to the thermal printhead. The printing area perfectly matches the shape of the label on a CD. The invention is applicable to thermal wax transfer printing, as well as to thermal dye transfer printing. The circular printing path helps balance the mass for smooth movement at high spinning speed. The lamination coating on the thermal dye image protects the image from finger printing and physical abrasion. The thermal dye transferred image is more water-fast than ink jet prints.

The invention has been described in detail with particular reference to preferred embodiments thereof, but it will be understood that variations and modifications can be effected within the spirit and scope of the invention. For instance, the image processing and printing control methods disclosed herein may be applied to ink jet, electrophotography, thermal wax transfer, as well as to thermal dye sublimation printing methods. The term "compact disc" is used herein to refer to various forms of disc data-storage media, such as CD-ROM, CD-R, CD-E, DVD, DVD-R, DVD-ROM, DVD-RAM, etc.

What is claimed is:

1. Apparatus for digital printing images in annular-radial coordinates onto discs having an axis of rotation, the printing to occur between an inner radius R1 of the disc and an outer radius R2 of the disk; said apparatus comprising:

a linear printhead array extending radially of the disc at least between inner radius R1 and outer radius R2; and a drive adapted to rotate the disc about the axis while the printhead is imagewise addressed to create an imaged area that is symmetric to the center of the disc and adapted to rotate the disc at an annular velocity such that the spatial resolution of the printed image along the outer edge of the image is the same as that of an original image being printed, wherein the image area is divided into discrete sections to be printed in associated tiles located on the disc such that:

$$(xi, yi) => (ri, \theta i),$$

where (xi, yi) are local coordinates of the center of the associated tile, and (θi is determined by a radial line through the center of the associated tile.

2. Apparatus as set forth in claim 1, wherein the image area is continuous about substantially the entire annular surface of the disc.

3. Apparatus as set forth in claim 1, wherein the lower corners of the tiles do not overlap each other.

4. Apparatus as set forth in claim 1, wherein each pixel having a position (x, y) within each tile is translated to a polar coordinate (r, θ) on the disc by the following two equations:

$$x - x_i = r \sin(\theta - \theta_i)$$

and $$y - y_i = r \cos(\theta - \theta_i) - r_i.$$

5. Apparatus as set forth in claim 1, further comprising means for increasing printing power along the printhead as a direct function of radii.

6. Apparatus for digital resistive thermal printing images in annular-radial coordinates onto discs having an axis of rotation, the printing to occur between an inner radius R1 of the disc and an outer radius R2 of the disk; said apparatus comprising:

a linear resistive thermal printhead array extending radially above the disc at least between inner radius R1 and outer radius R2;

a drive adapted to rotate the disc about the axis while the printhead is imagewise addressed to create an imaged area that is symmetric to the center of the disc and adapted to rotate the disc at an annular velocity such that the spatial resolution of the printed image along the outer edge of the image is the same as that of an original image being printed; and a platen roller below the disc aligned with the printhead array, wherein the image area is divided into discrete sections to be printed in associated tiles located on the disc such that:

$$(xi, yi) => (ri, \theta i),$$

where (xi, yi) are local coordinates of the center of the associated tile, and (i is determined by a radial line through the center of the associated tile.

7. Apparatus as set forth in claim 6, wherein the platen roller is cone-shaped, having an a radius $r_1$ at inner radius $R_1$ of the disc and a radius $r_2$ at outer radius $R_2$ of the disc, wherein the ratio of the radius $r_2$ to radius $r_1$ of the platen roller is substantially equal to the ratio of the outer radius $R_2$ to the inner radius $R_1$ of the disc such that:

$$r_2/r_1 = R_2/R_1.$$

8. Apparatus as set forth in claim 6, wherein the platen roller is adapted to drive the disc.

9. Apparatus as set forth in claim 6, wherein the platen roller is an idler.

* * * * *